United States Patent

Chacon Sevila et al.

[11] Patent Number: 5,251,784
[45] Date of Patent: Oct. 12, 1993

[54] PACKAGED PRODUCTS DISPENSER DEVICE

[75] Inventors: Rafael I. Chacon Sevila; Jose R. Garcia Rovira, both of Alicante, Spain

[73] Assignee: S. L. Assembler, Alicante, Spain

[21] Appl. No.: 829,077

[22] PCT Filed: Aug. 2, 1990

[86] PCT No.: PCT/ES90/00027
§ 371 Date: Feb. 14, 1992
§ 102(e) Date: Feb. 14, 1992

[87] PCT Pub. No.: WO91/19660
PCT Pub. Date: Dec. 26, 1991

[30] Foreign Application Priority Data
Jun. 20, 1990 [ES] Spain ................................ 9001712

[51] Int. Cl.⁵ .................................................. G07F 11/24
[52] U.S. Cl. ........................................ 221/220; 221/237; 221/251
[58] Field of Search ............... 221/219, 220, 224, 236, 221/237, 251, 258

[56] References Cited

U.S. PATENT DOCUMENTS

| 2,496,304 | 2/1950 | Muffly | 221/258 X |
|---|---|---|---|
| 2,599,685 | 6/1952 | Berger et al. | 221/251 X |
| 2,638,396 | 5/1953 | Gabrielsen | 221/258 X |
| 2,821,329 | 1/1958 | Casey et al. | 221/243 |
| 3,433,545 | 3/1969 | Rainey | 221/92 X |
| 3,502,382 | 3/1970 | Rainey | 221/251 X |
| 3,508,680 | 4/1970 | Ewald et al. | 221/258 |
| 3,606,081 | 9/1971 | Croteau et al. | 221/258 X |
| 3,970,216 | 7/1976 | Rainey | 221/125 |
| 5,092,489 | 3/1992 | Paster et al. | 221/258 X |

FOREIGN PATENT DOCUMENTS 658581 4/1938 Fed. Rep. of Germany .
2149596 3/1973 France .

Primary Examiner—Robert P. Olszewski
Assistant Examiner—Dean A. Reichard
Attorney, Agent, or Firm—Louis Weinstein

[57] ABSTRACT

Packaged products dispenser device, consisting of a compartment situated on the lower part of a vertical loader (1) equipped with a base-plate (2) bearing the pile normally perpendicular with respect to it, and capable of turning downwards around a lower axis (3) such that, together with a retaining element (5) which holds the second product of the pile, the product situated underneath towards one side and in downward direction is expelled.

15 Claims, 3 Drawing Sheets

PACKAGED PRODUCTS DISPENSER DEVICE

FIELD OF THE INVENTION

The present specification, as indicated in the title, refers to a dispenser device of products such as the types employed to be sold automatically, which device consisting of a compartment placed at the bottom of the pile as a result of an electromechanical action derived from the machine.

BACKGROUND OF THE INVENTION

As present, many products, packaged or bottled, are distributed and disposed to the consumer by way of appreciably standard measures. As a characteristic example, the dispenser machines for cigarettes or drinks can be mentioned. In such machines, the products are introduced and piled up in vertical loaders consisting of a base-plate at the bottom which prevents the outfalling of the products through the lower zone.

The activating function of traditional dispensers is carried out by way of a pushing rod which displaces the product situated on the bottom towards one side supplied by a window, while the rest of the elements of the pile stay inside the loader. Another alternative solution is to make use of a lever whose revolving evolution reaches on to the lower package, removing it by the same manner towards one side. Both mechanisms occupy a considerable space, increasing for that matter, the size of the machine.

In both of the known versions, the lower product makes displacements at the bottom while it is trapped between the base of the dispenser and the weight of the pile of products. In some cases the weight of the column, and in others, the fact that many packaged products are usually wrapped in an exterior cover, a certain light sticking between the products is occasioned. As a result of that, the dispenser device has to make great effort for which, having in mind the fragility of the package, fractures or raptures in the package are produced.

As a consequence, the purpose is not only to deliver the product situated below, but also to do this in such a way that it separates itself easily from the upper one and that it goes out by its own weight without any barriers. Moreover, the purpose is also to avoid unnecessary spaces inside the machine for the fact that if the product does not have to go out towards one side or towards the front, this surface can be occupied by other elements, reducing for that matter the space occupied by the device and consequently the size of the machine.

BRIEF DESCRIPTION OF THE INVENTION

In other to achieve the formerly exposed requirements, the dispenser device of products, and the subject of the present invention, has been designed presenting the special particularity of expelling the product from underneath the horizontal plane that passes through the base-plate. In order to do that, the base-plate, that is used as a support to the pile of products, is enabled to make a revolving movement around the axis situated below it. In order to carry out the expulsion of one product, this device is equipped with an element to retain the rest of the pile, holding the second lower product in the pile.

BRIEF DESCRIPTION OF THE FIGURES

In order for the subject of the present invention to be better understood, a practical and preferred embodiment of the same is presented in the accompanying drawings.

DETAILED DESCRIPTION OF THE INVENTION AND THE PREFERRED EMBODIMENTS THEREOF

Figure 1:
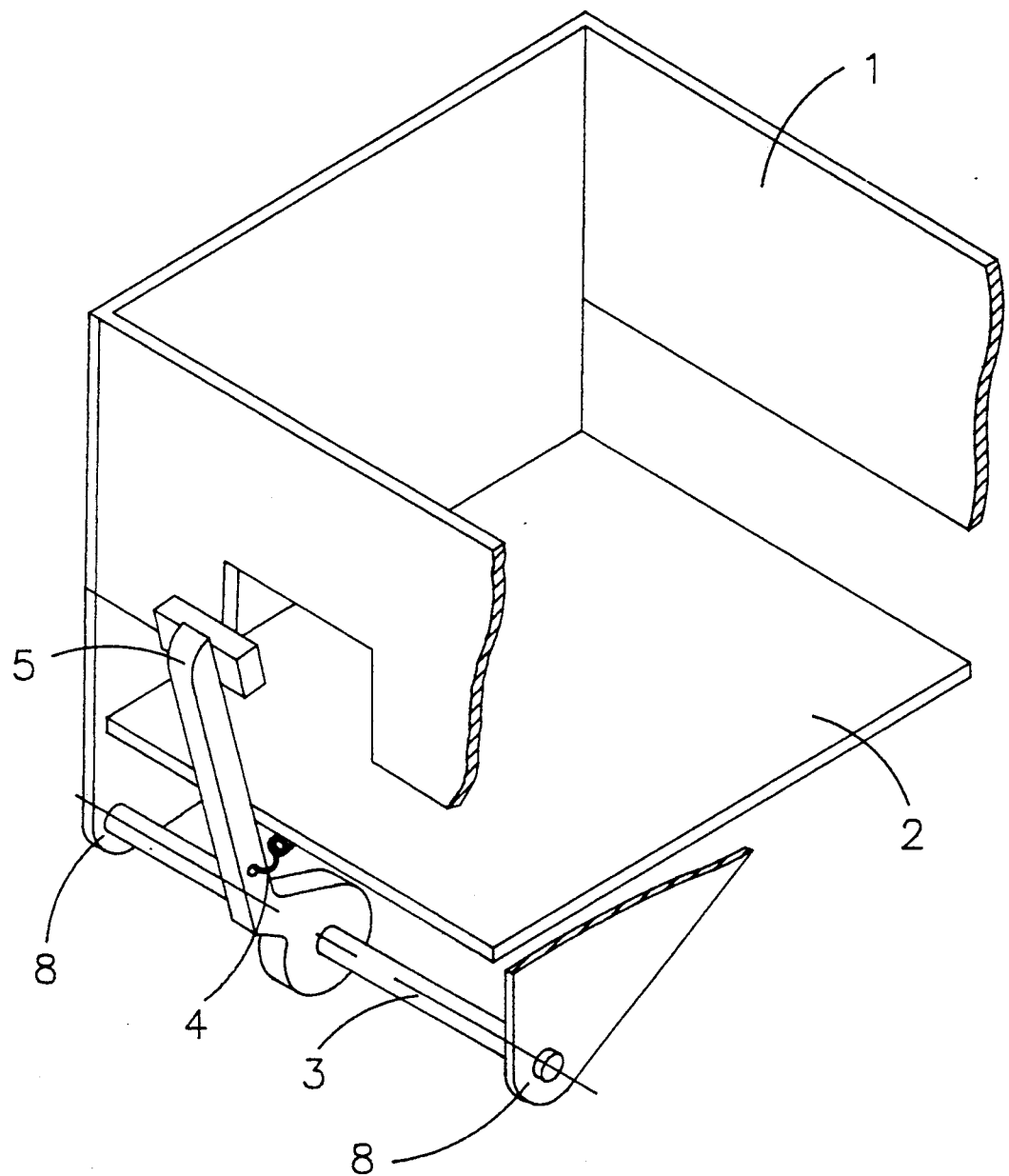
FIG. 1 shows a perspective view of the dispenser device of products.
Figure 2:
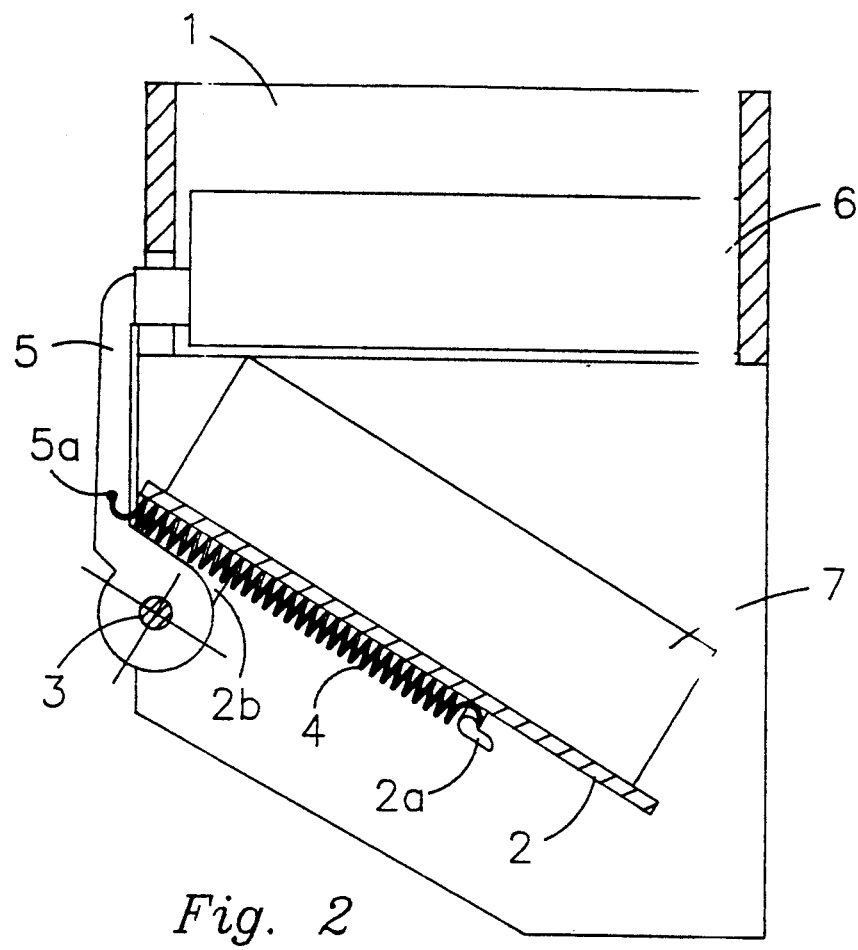
FIG. 2 shows a side view of the device at the instant in which the expulsion of one of the products is taking place.

As it can be observed from the figures, the dispenser device of products, consists of a compartment (1), situated at the base of a vertical loader that contains a variable number of piled up products inside. The compartment secured on to the machine, presents in its lower part a base-plate (2), normally perpendicular with respect to it, bearing the column of products contained in the loader. This bearing base (2) can turn downwards, revolving around an axis (3), so that through each tilt operation, the last product is expelled downwards. Moreover, it has a spring (4) incorporated on its lower face near the side from which the products are expelled. Base-plate (2) is swingably mounted to axis (3) by integral projection (2b).

In order to expel the corresponding product towards the lower zone, this device also incorporated a retaining element (5) that acts over the second lower product of the pile. This retaining element is mounted over the axis (3) and is joined to the opposite extreme of the spring (4) at (5a) which is connected to the base-plate (2) at (2a), imposing pressure on the second product through a window in the compartment and in an inward direction. The coupling between the retaining element and the axis provides a limiting top point so that when the base-plate is horizontally positioned, the retaining element (5) stands vertically and the pile of the products rests, therefore, on the base-plate. As the base-plate (2) turns, the retaining element (5) tends to introduce itself inside the compartment (1). Its length is calculated in such a way that it engages the second product (6) of the pile, so that it retains all the element of the column, except the lower one (7) which rotates together with the base-plate (2) in order to be expelled towards the front side and in the down direction.

The axis (3) is mounted on a pair of holes (8) situated on each side of the compartment (1) under the base-plate (2) and near the side opposite to the one through which the expulsion of the product is carried out, in such manner that when the tilting movement of the plate (2) takes place, the lower product (7) is easily released from the rest of the pile and is expelled out downwardly, although with certain inclination.

Figure 3:
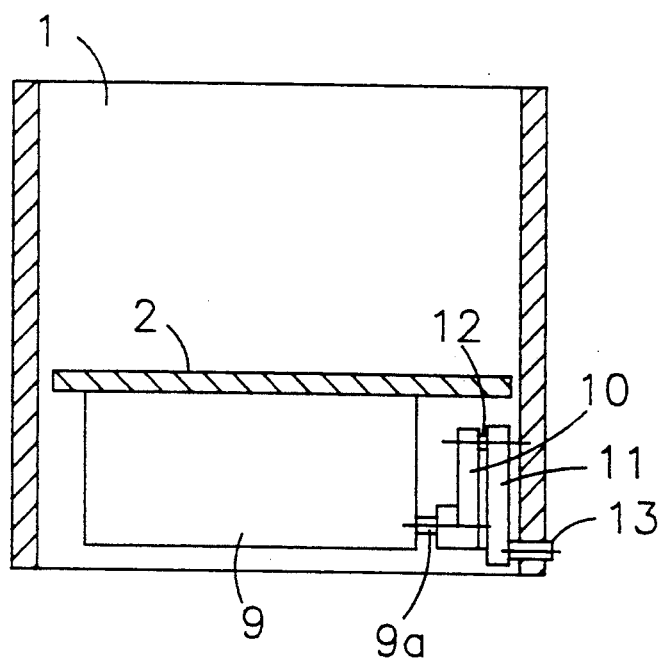
FIG. 3 shows a front view of one embodiment variant of the driving mechanism of the device.

The functioning of this device, basically consists of transmitting a rotary movement on to the axis (3) that can be carried out by any method, and generally activated externally by virtue of an element that can put into action any one of the multiple dispensers that are located inside a products dispenser machine, or preferably the mechanism represented in FIG. 3.

In this figure, a small activating motor (9) can be observed which is mounted on the lower face of the base-plate (2) that bears the products. On the shaft (9a) of the motor a set of arms (10) and (11) can be observed. The opposite extreme of the set is joined by pin (13) to the body of the compartment (1x). Arms (10) and (11) are pivotally joined to one another by pin (12). One complete revolution of the shaft (9a) of this motor, departing from a horizontal initial position of the plate, produces a downward turn of the plate and its return to its original position. Hence, controlling the movement or the grade of the turning angle of the motor, the action of expulsion of one of the products can be easily obtained.

Figure 4A:
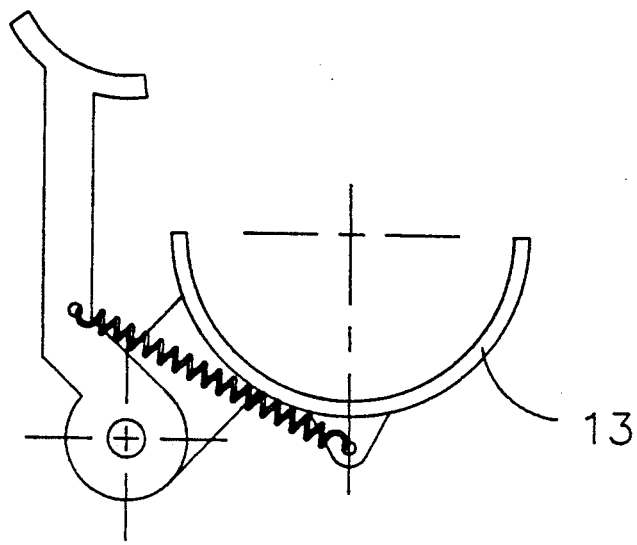
FIGS. 4a and 4b show side views of some possible configurations that the base-plate can adopt, together with the element of retention according to each case to the shape of the product to be delivered.
Figure 4B:
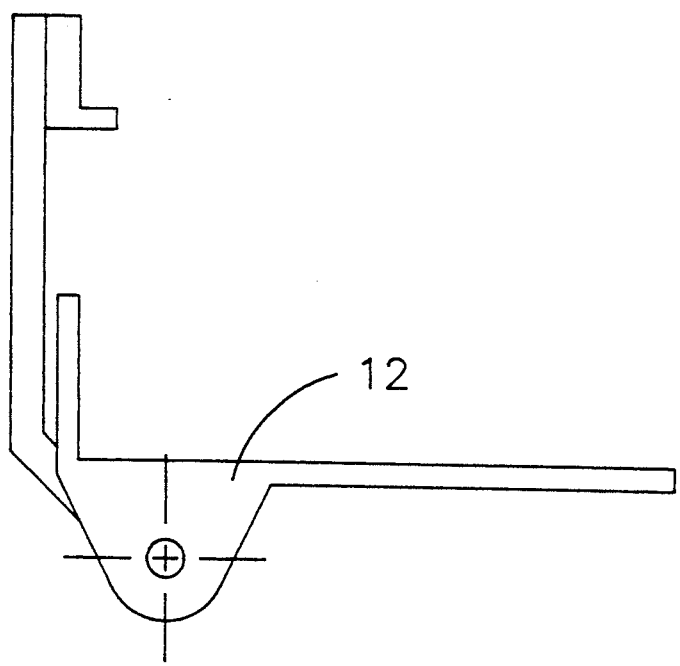

As it can be observed from FIGS. 4a and 4b the base-plate and the retaining element can adopt various configurations according to the shape of the product to be delivered.

In the mentioned figures, some examples are indicated such as one for delivery of cigarette boxes (12) shown in FIG. 4b, or cans of drinks (13) or spherical products of the type of balls in packages of one or various units as shown in FIG. 4a.

Once sufficiently described the nature of the invention, together with one form of putting it into practice, it only remains to be added that it is possible to introduce changes in form, materials, and disposition over all the invention or over the parts that it is composed of as long as such alternations do not vary substantially the characteristics of the invention claimed as follows.

We claim:

1. Packaged products dispenser device, of such type used to sell products automatically, characterized in that it incorporates a compartment situated on the base of a vertical loader, which holds a pile of products by compartment walls and delivers one by one, the products piled up in the loader, delivering a product situated at a bottom and based on a down tilting movement of a base-plate incorporated in said compartment and a substantially simultaneous operation of a retaining element that, upon tilting of the base-plate is moved toward the compartment; also characterized by said base-plate supporting the pile of products, normally being perpendicular with respect to said compartment walls, and capable of rotating about an axis to release a lower product by expelling it downwards and towards a first side of the base-plate opposite said axis; and a retaining element rotatable independently of said base-plate, and activated by resilient means responsive to a tilting movement of the base-plate, to rotate said retaining element toward engagement with a product for holding the rest of the pile of products by immobilizing the product above the one being dispersed.

2. A dispenser device according to claim 1, characterized in that the compartment is provided with a hole on each side of a lower part of the compartment, constituting a locating point of said axis, said axis being located beneath the base-plate and near a second side of the base-plate opposite said first side, having a purpose of provoking a downward tilt of the base-plate and therefore an easy sliding of products off of said base-plate.

3. A dispenser device according to claim 1, characterized in that the base-plate incorporates a spring mounting, and said resilient means comprising a spring means coupled between said retaining element and said spring mounting, for normally maintaining the base-plate in a substantially horizontal position.

4. A dispenser device according to claim 1, characterized in that said retaining element consists of a projection mounted to swing about said axis, and being joined to the base-plate by said resilient means comprised of a spring, whereby rotating said axis, moves the projection towards the compartment, to press against the penultimate product in order to retain the pile against downward movement when the base-plate tilts and expels a lower product, and finally returning the projection to its original position when the base-plate is horizontally situated, hence letting fall the lower product together with the rest of the pile upon the base-plate.

5. Packaged products dispenser device, of such type used to sell products automatically, characterized in that it incorporates a compartment situated on the base of a vertical loader, which holds a pile of products by compartment walls and delivers one by one, the products piles up in the loader, delivering a product situated at a bottom; also characterized by a base-plate to support the pile of products, normally being perpendicular with respect to said compartment walls, and capable of rotating about an axis to release a lower product by expelling it downwards and towards a first side of the base-plate opposite said axis; and a retaining element rotatable independently of said base-plate, and activated by a tilting movement of the base-plate, for holding the rest of the pile of products by immobilizing a product above the one being dispersed:
rotational movement of the base-plate being obtained by way of a motor installed upon the base-plate, which, by way of an output shaft, activates a double arm set with its end placed on a fixed point of the compartment or the axis of rotation in such a way that rotary movement of the motor output shaft is converted to a lowering down and subsequent raising of the base-plate; and being further characterized by controlling an angular displacement of the base-plate, a complete cycle of expulsion of a product and return to its horizontal position being achieved.

6. A dispenser device according to claim 1, characterized in that the base-plate and the retaining element have configurations conforming to a shape of product to be delivered.

7. Dispenser apparatus for dispensing articles arranged to be disposed one upon the other forming a pile of articles, comprising:
a hollow housing open at its upper and lower ends, said upper end being positioned to receive said articles;
a base-plate positioned beneath the open lower end of said housing;
means for swingably mounting one end of said base-plate relative to said housing, said base-plate being movable about an axis adjacent a first end of the base-plate between a first substantially horizontally aligned position arranged just below said lower opening and a second diagonally aligned position so that a free end of said base-plate opposite from said first end is positioned a displaced distance below said lower opening enabling an article resting thereon to slide diagonally downwardly and off said base-plate and toward a dispensing location; and
a retaining element swingably mounted about said axis independently of said base-plate and having a free end movable between a first position displaced from said housing when said base-plate is in said horizontal position and a second position engaging an article in said housing immediately above an article on said base-plate, responsive to a resilient means coupled between said base-plate and said retaining element, when said base-plate is in said diagonally aligned position.

8. The dispenser apparatus of claim 7 wherein said coupling means comprises a resilient spring.

9. The dispenser apparatus of claim 7 further comprising resilient spring means coupled between said retainer element and said base-plate whereby movement of said retainer element is imparted to said base-plate.

10. The dispenser apparatus of claim 7 further comprising motor means for swingably moving said base-plate.

11. Dispenser apparatus for dispensing articles arranged to be disposed one upon the other forming a pile of articles, comprising:
- a hollow housing open at its upper and lower ends, said upper end being positioned to receive said articles;
- a base-plate positioned beneath the open lower end of said housing;
- means for swingably mounting one end of said base-plate relative to said housing, said base-plate being movable about an axis adjacent a first end of the base-plate between a first substantially horizontally aligned position arranged just below said lower opening and a second diagonally aligned position so that a free end of said base-plate removed from said first end is positioned a displaced distance below said lower opening enabling an article resting thereon to slide diagonally downwardly and off said base-plate and toward a dispensing location; and
- a retaining element swingably mounted about said common axis and having a free end movable between a first position displaced from said housing when said base-plate is in said horizontal position and a second position engaging an article in said housing immediately above the article on said base-plate when said base-plate is in said diagonally aligned position;
- motor means for swingably moving said base-plate;
- said motor means being secured to an underside of said base-plate and further including lever means coupled between an output shaft of said motor means and said housing for moving said base-plate between said first and second positions responsive to a partial revolution of an output shaft of said motor means.

12. The dispenser apparatus of claim 11 wherein rotation of said output shaft subsequent to said part revolution to complete one full revolution moves the base-plate from said second position back to said first position.

13. The dispenser apparatus of claim 12 wherein said lever means comprises a first lever arm having first and second ends;
- a second lever arm having first and second ends;
- the first end of said first lever arm being pivotally mounted to said motor means output shaft;
- the second end of said first lever arm being pivotally mounted to the first end of said second lever arm; and
- the second end of said second lever arm being pivotally mounted to said housing.

14. The dispenser apparatus of claim 7 wherein said housing is provided with an opening at a lower end of said housing adjacent said base-plate;
- said retainer element having a free end portion thereof for movement into said housing opening to engage an article when said base-plate is in said second position.

15. A dispenser device according to claim 6 wherein the base-plate and retaining element each have curved configurations to conform to a curved shape of a product to be delivered.

* * * * *